US012132844B1

(12) United States Patent
Allen et al.

(10) Patent No.: US 12,132,844 B1
(45) Date of Patent: Oct. 29, 2024

(54) PRIVACY PRESERVING ATTESTATION

(71) Applicant: Amazon Technologies, Inc., Seattle, WA (US)

(72) Inventors: Nicholas Alexander Allen, Kirkland, WA (US); Daniel Ron Simon, Seattle, WA (US); Andrew Hopkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 17/890,976

(22) Filed: Aug. 18, 2022

Related U.S. Application Data

(62) Division of application No. 16/836,561, filed on Mar. 31, 2020, now Pat. No. 11,424,939.

(51) Int. Cl.
*H04L 9/32* (2006.01)

(52) U.S. Cl.
CPC .......... *H04L 9/3265* (2013.01); *H04L 9/3218* (2013.01); *H04L 9/3234* (2013.01); *H04L 9/3247* (2013.01)

(58) Field of Classification Search
CPC ... H04L 9/3265; H04L 9/3218; H04L 9/3234; H04L 9/3247; H04L 9/3268; H04L 9/3221; H04L 9/3249; H04L 9/3252; H04L 9/3255; H04L 9/32
See application file for complete search history.

(56) References Cited

U.S. PATENT DOCUMENTS

| | | | |
|---|---|---|---|
| 10,051,042 | B2 | 8/2018 | Diwakar |
| 10,735,205 | B1* | 8/2020 | Wentz ................... H04L 9/3257 |
| 2006/0056621 | A1* | 3/2006 | Ramzan ............... H04L 9/3257 |
| | | | 380/28 |
| 2007/0256125 | A1* | 11/2007 | Chen ..................... H04L 9/3234 |
| | | | 726/18 |
| 2008/0092060 | A1 | 4/2008 | Berg et al. |
| 2013/0198838 | A1* | 8/2013 | Schmidt ............... H04L 63/126 |
| | | | 726/22 |
| 2014/0189362 | A1* | 7/2014 | Van Den Broeck ........................ |
| | | | G06F 11/1446 |
| | | | 713/176 |
| 2015/0121496 | A1 | 4/2015 | Caldeira De Andrada et al. |
| 2018/0181756 | A1* | 6/2018 | Campagna ............. H04L 9/088 |
| 2019/0020641 | A1* | 1/2019 | Wasily .................... G06F 21/44 |
| 2019/0229919 | A1 | 7/2019 | Gurkan et al. |
| 2020/0014537 | A1 | 1/2020 | Ortiz et al. |
| 2021/0243035 | A1* | 8/2021 | Ruane ................... H04L 9/0897 |
| 2023/0040203 | A1* | 2/2023 | Sanders ............. H04L 63/0421 |

\* cited by examiner

*Primary Examiner* — Quazi Farooqui
(74) *Attorney, Agent, or Firm* — Davis Wright Tremaine LLP

(57) ABSTRACT

Described implementations obtain a proof of valid attestation data. The attestation data may include configuration data of a host computing system. A prover service may receive the attestation data. The prover service may generate a proof to prove that the attestation data includes valid configuration data of the host computer system, without revealing sensitive or private information of the host computing system. The proof may be a zero-knowledge proof.

20 Claims, 7 Drawing Sheets

PRIVACY PRESERVING ATTESTATION

CROSS-REFERENCE TO RELATED APPLICATION

This application is a divisional of U.S. patent application Ser. No. 16/836,561, filed Mar. 31, 2020, entitled "PRIVACY PRESERVING ATTESTATION," the content of which is incorporated by reference herein in its entirety.

BACKGROUND

For many business entities, third-party computing resource service providers are an important part of their computing infrastructure. For example, some business entities deploy application programs to virtual computing environments provided by computing resource service providers. As the resource demands of applications change over time, a business entity can scale each virtual computing environment as needed. However, when using virtual computing environments in this way, maintaining the security of information used in the virtual computing environments is extremely complex and requires significant resources. For instance, application deployment may be contingent on various conditions of a computing environment being satisfied. For example, a deployment may be contingent with a computing environment complying with an appropriate configuration. Often, legitimate goals can compete with one another. For instance, a customer of a computing resource service provider may wish to verify various aspects of the resources provided by the provider in order to maintain security and other aspects of its systems. Providing such verification may, however, reveal information about the provider's infrastructure that the provider wishes to maintain confidential, such as to increase the difficulty of a malicious entity using such information to compromise the system in order to provide a more secure infrastructure for its customers.

BRIEF DESCRIPTION OF THE DRAWINGS

Various techniques will be described with reference to the drawings, in which.

DETAILED DESCRIPTION

Figure 1:
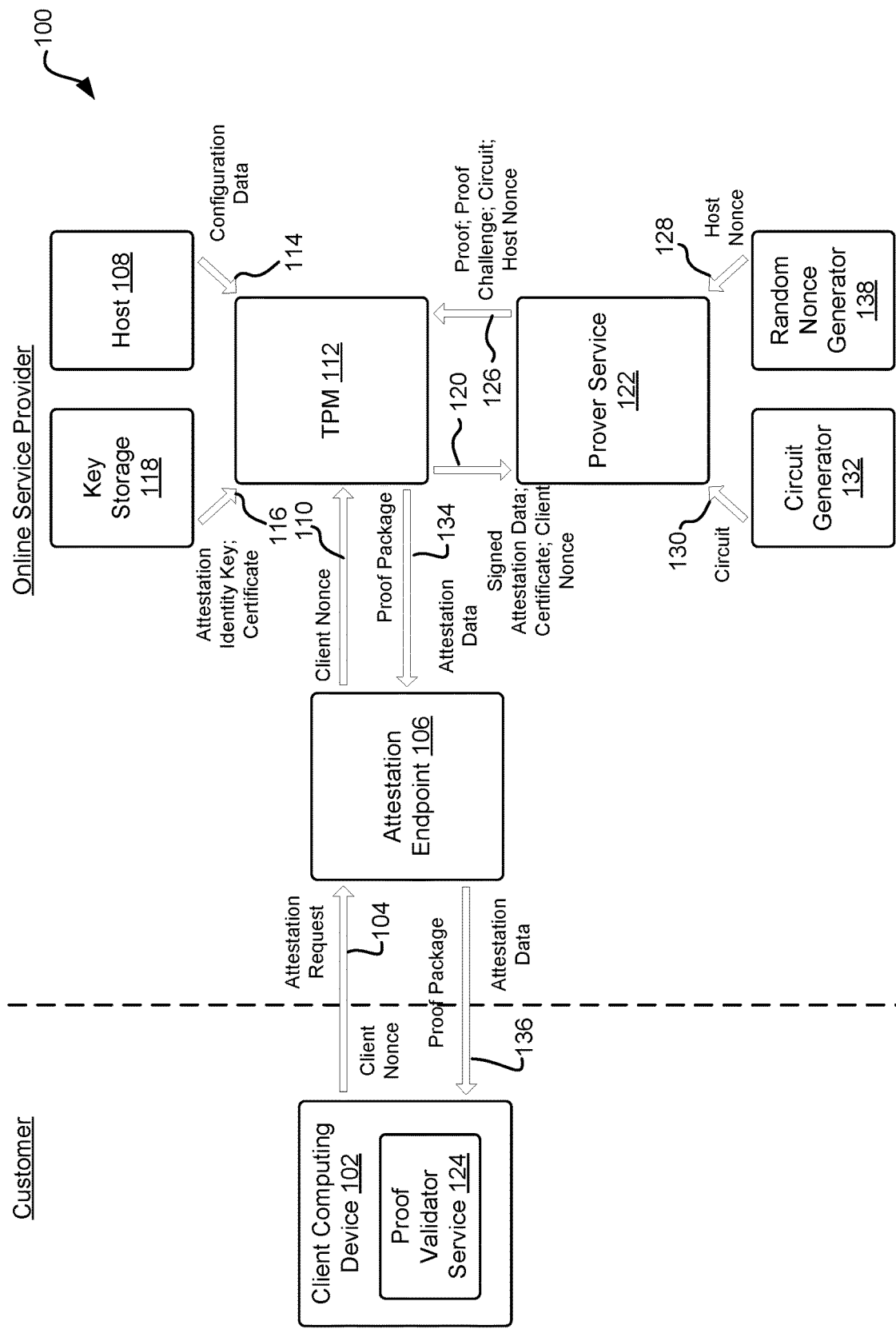
FIG. 1 illustrates a system environment that implements the computer-implemented attestation process.

This disclosure relates to a computer-implemented attestation process. The computer-implemented attestation process provides a proof of attestation data in a manner that protects the privacy of computer resources belonging to an online computer-implemented service provider. The proof of the attestation data is devoid of information that is considered by the service provider as private or sensitive. For example, the computer-implemented attestation process results in a proof that does not reveal properties associated with computing resources of the service provider. Specifically, the proof, in some examples, does not reveal an identity of a related host computing system, a signature linked to an attestation identity key used to sign the attestation data, or private or sensitive data that can be included in the attestation data.

To receive the proof of the attestation data, an entity can generate an attestation request using a computing device. The entity can generate the attestation request to confirm the trustworthiness and integrity of a virtual computing environment provided by the service provider. The virtual computing environment can include one or more server computer systems, server clusters, virtual computer systems, or other host computing systems. The entity can impose various constraints on the host computer systems and the images and software installed on the virtual computing environments. The service provider can respond, using a computing device, to the attestation request by generating the proof of the attestation data to confirm that the various constraints imposed by the entity are being followed by the service provider, and to establish the trustworthiness and integrity of the virtual computing environment, including the one or more server computer systems, server clusters, virtual computer systems, or other host computing systems. In some implementations, the entity requesting the proof of the attestation data is a customer of the service provider, where the customer contracts with the service provider to obtain virtualized computing resources, such as scalable distributed storage, virtual servers, and database services.

The customer's computing device can communicate the attestation request to the service provider. The service provider can implement an attestation endpoint that receives attestation requests from customer computer devices. The attestation request communicated by the customer's computing device can include information specifying the one or more server computer systems, server clusters, virtual computer systems, or other host computer systems, collectively or individually referred to herein as a host, host computing device, host computer, or host computing system, and a client nonce. The attestation endpoint evaluates the attestation request and forwards the client nonce to the host referenced in the attestation request. The attestation endpoint may also forward a message, to the host, that contains some or all of the information contained in the attestation request and instructions that may aid in generating attestation data. For example, the message may include a request to obtain configuration information of the host, where the configuration information can be used to obtain or generate attestation data that includes attestation parameters that may include timestamp data, at least some of the configuration information, the client nonce, and so forth.

The host that receives the client nonce and the message, if included, can implement a trusted platform module (TPM). The TPM can be part of a dongle or computer peripheral coupled to the host. In some implementations, the TPM is integrated with the host, such as on an integrated circuit of the host hardware. The TPM is used to verify the integrity of the host. The TPM, specifically, is able to validate the hardware of the host as well as the software installed on the host. The TPM examines the host and/or configuration data provided by the host and generates attestation data, which can be associated with an attestation document, summarizing the hardware and software configuration of the host. As descried, in some implementations, the attestation data may include at least a portion of the configuration data obtained from the host. For example, the attestation data may include one or more attestation parameters including a timestamp, information associated with the attestation request, the client nonce, configuration data of the host, and/or identity information associated with a key belonging to the TPM. The TPM signs the attestation document using a secret portion of an attestation identity key, such as certified private key, owned by the TPM. In some implementations, the attestation identity key is a signing key (comprising a private/public key pair) that is used to provide host authentication based on the attestation capability of the TPM. Thus, the attestation identity key allows the TPM to produce cryptographically signed attestation evidence (e.g., attestation data) about the configuration and operational state of the host.

In some implementations, the TPM also includes an attestation identity key certificate. Alternatively, another computing device, such as the attestation endpoint, may hold the attestation identity key certificate on behalf of the TPM. The certificate provides proof that the attestation identity key is a signing key restricted to the TPM and usable to verify the integrity of the host. In some implementations, the attestation identity key certificate is issued by a trusted certification authority (CA) and includes a certificate chain to establish a chain of trust. In general, CAs may represent entities, processes, and tools that create digital certificates that securely bind the names of entities to public keys. A CA's signature on a certificate allows any tampering with the contents of the certificate to be easily detected. As long as the CA's signature on a certificate can be verified, the certificate has integrity. In some implementations, the attestation identity key certificate identifies the TPM, the host associated with the TPM, includes a public portion of the attestation identity key (e.g., a public attestation identity key), such as a certified public key, owned by the TPM, provides a validity duration of the certificate, and includes a summary of operations for which the public portion of the attestation identity key is to be used (e.g., encrypting data, verifying digital signatures, and so forth).

The TPM generates attestation data related to the host. The attestation data can include information confirming that the service provider has validated that the host is a properly configured host computing device or system operated by the service provider, that the host computing system is hosting a valid virtual computer system(s), that the virtual computer system(s) has a confirmed and valid operating environment and/or operating system, and so forth. The attestation data can be included in an attestation document, message, or another suitable format. The attestation data generated by the TPM may include attestation parameters. At least one of the attestation parameters may include configuration data obtained from the host.

The TPM signs the attestation data using the attestation identity key. The TPM can also couple the attestation identity key certificate to the attestation data. The signature on the attestation data and/or the certificate to the attestation data can include information related to the TPM, service provider, and the host that the service provider does not wish to reveal to the entity (e.g., the customer) that generated the attestation request.

The TPM can be coupled to a prover service implemented on a computing device. The computing device that implements the prover service can be the same computing device or host that implements the TPM, and the computing device can be part of the infrastructure provided by the service provider. In some implementations, the prover service can be a zero-knowledge proof generating prover service.

The TPM can communicate the signed attestation data to the prover service. The signed attestation data can be communicated to the prover service with the client nonce and the attestation identity key certificate. The attestation identity key certificate may be communicated by the TPM or some other computing device of the online service provider. The prover service can generate a proof. The proof referred to herein is to be understood as comprising proof data. The proof, and associated proof data, confirms that the attestation data comprises host configuration data validated by the TPM and/or valid attestation parameter(s) provided or generated by the TPM. The proof can also confirm that the attestation data was signed with a valid attestation identity key held by the TPM. Furthermore, the proof confirms that the TPM provided a valid attestation identity key certificate comprising a valid certificate chain establishing a chain of trust, and in some implementations, a valid public portion of the attestation identity key used to produce the signed attestation data. The proof does not reveal anything about the signature on the attestation data. Moreover, the proof does not reveal anything about the attestation identity key certificate, information associated with the public portion of the attestation identity key, configuration data obtained or validated by the TPM, and/or attestation parameter(s) provided or generated by the TPM.

In some implementations, the proof is a zero-knowledge proof generated by a zero-knowledge prover service. The proof can be an interactive or non-interactive zero-knowledge proof. The zero-knowledge proof can be generated with the aid of a proof program, also referred to herein as a circuit, that accepts private or secret inputs and generates a computation, that when included in the proof in encrypted form, shows that the program accepted the inputs as valid and was executed correctly, without revealing anything about the private or secret inputs or the execution of the program. For example, the zero-knowledge proof proves, by way proof data including an encrypted version of a computation that can be verified by the customer that obtains the proof, that the attestation data was signed with a valid attestation identity key held by the TPM. Furthermore, the proof confirms, by way of the encrypted version of a computation that can be verified by the customer that obtains the proof, that the TPM provided a valid attestation identity key certificate comprising a valid certificate chain establishing a chain of trust, and in some implementations, provided a valid public portion of the attestation identity key used to produce the signed attestation data. The proof may also confirm, when verified, a validity of some or all of attestation parameters and/or configuration data included in the attestation data generated or provided by the TPM.

The prover service can also use the client nonce to generate a proof challenge. Specifically, the prover service can generate a host nonce. Similar to the client nonce, the host nonce can be a randomly generated value for single use. The prover service combines the client nonce and the host nonce to generate the proof challenge. In some implementations, the prover service combines the client nonce and the host nonce using a concatenation function common to the prover service and a proof validator service on a computing device of the customer. To enhance security, a cryptographic primitive can be applied to the output of the concatenation function to generate a proof challenge. The cryptographic primitive can be common to the prover service and the proof validator on the computing device of the customer. The proof validator service, in some implementations, is a zero-knowledge proof validator service to validate zero-knowledge proofs.

The prover service can communicate the proof and the proof challenge to the TPM. In some implementations, the prover service can also communicate a scrubbed version of the attestation data, generated by the prover service by removing at least the signature from the signed attestation data. In some implementations, the TPM can generate the scrubbed version of the signed attestation data once the proof and the proof challenge are obtained from the prover service. In other implementations, the TPM simply uses the unsigned attestation data, previously generated by the TPM, as the scrubbed version of the signed attestation data. The scrubbed version of the attestation data is devoid of sensitive and private information or data identified by the online service provider or the TPM. Such sensitive and private information includes identity information of the online service provider, the host, the TPM, credential information, and so forth.

The prover service can also communicate a circuit that was used by the prover service to, at least in part, generate the proof and associated proof data. The circuit, when used to validate the proof, can be used by the customer to verify the proof generated by the prover service. Specifically, the circuit produces data, such as one or more output values, that is associated with the proof and related proof data provided by the prover service. The proof and the associated proof data can be used by the TPM and/or attestation endpoint to confirm to the customer that the attestation identity key used to sign attestation data satisfies a certain set of relationships confirmed by the circuit, without revealing to the customer private or secret information associated with the signature. Furthermore, the proof and the associated proof data can be used by the TPM and/or attestation endpoint to confirm to the customer that a valid attestation identity key certificate comprising a valid certificate chain establishing a chain of trust, and in some implementations, a valid public portion of the attestation identity key, satisfy a certain set of relationships confirmed by the circuit, without revealing to the customer private or secret information associated with the certificate and the public portion of the attestation identify key. In addition, the proof and the associated proof data can be used by the TPM and/or attestation endpoint to confirm to the customer that the attestation data included valid configuration data of the host and/or valid attestation parameters generated by the TPM. The data provided by the circuit can be one or more output values indicating whether or not the TPM provided attestation data that was signed with a valid attestation identity key and included a valid attestation identity key certificate. The one or more output values can also indicate whether or not the attestation data included valid configuration data of the host and/or valid attestation parameters generated by the TPM. Specifically, in some implementations, the circuit can output one or more true/false statements or values (e.g., 1 or 0). A true statement or value indicates that the TPM provided attestation data that was signed with a valid attestation identity key and included a valid attestation identity key certificate. A false statement or value indicates that the prover service was not able to verify the signature on the attestation data and/or the attestation identity key certificate. However, the output of one or more true statements or values and the absence of false statements or values may not result in the acceptance of related attestation data, such as scrubbed attestation data, as valid. For example, despite the output of one or more true statements or values, a customer may reject a validated proof because some or all of the scrubbed attestation data is unacceptable to the customer.

In some implementations, the circuit is mutually agreed upon by the customer and the service provider that implements the prover service. For example, the circuit can be obtained or otherwise received by the customer before TPM generates the attestation data. Similarly, the circuit can be obtained by the service provider before the proof is provided to the customer. In some implementations, the service provider, as indicated in the foregoing, can communicate the circuit to the customer subsequent to receiving the attestation request. In some implementations, the circuit can be generated by the service provider or a trusted third-party proving circuit provider.

Having obtained or otherwise received the proof, the proof challenge and the host nonce, the TPM can communicate attestation data, such as scrubbed attestation data, to the attestation endpoint. The scrubbed attestation data can be communicated in an attestation document or message. The scrubbed attestation data does not reveal information related to the TPM or information related to the host. The TPM also communicates the proof, the proof challenge, and the host nonce to the attestation endpoint. In some implementations, the TPM also communicates the circuit to the attestation endpoint. In some implementations, the TPM communicates the proof, the proof challenge, and the host nonce to the attestation endpoint as part of a proof package. In some implementations, the TPM may not communicate the scrubbed attestation data, as the proof package can be sufficient to allow the customer to verify and confirm the configuration of the host. In some implementation, the customer may accept the proof as sufficient to verify and confirm the configuration of the host.

In some implementations, the attestation endpoint communicates the scrubbed attestation data, as needed or requested, to the customer that generated the attestation request. Specifically, the scrubbed attestation data can be communicated to a computing device belonging to the customer. The attestation endpoint can also communicate the proof, the proof challenge, and the host nonce to the customer. In some implementations, the attestation endpoint also communicates the circuit to the customer, if the customer does not already possess the circuit.

A computing device associated with the customer can implement a proof validator service. The proof validator service can be a zero-knowledge proof validator service. The proof validator service receives the host nonce and the proof challenge. The proof validator service uses the client nonce, which is stored in computing device associated with the customer, and the host nonce to generate a proof validator challenge. The proof validator service combines the client nonce and the host nonce to generate the proof validator challenge. In some implementations, the proof validator service combines the client nonce and the host nonce using a concatenation function common to the prover service and the proof validator service. To enhance security, a cryptographic primitive can be applied to the output of the concatenation function to generate a proof validator challenge. The cryptographic primitive can be common to the prover service and the proof validator service. The proof validator service, in some implementations, is a zero-knowledge proof validator service to validate zero-knowledge proofs.

The proof validator service confirms that the proof validator challenge is equal to the proof challenge obtained from the attestation endpoint. Validation of the proof fails and the attestation data and/or proof are disregarded when the challenges do not match. When the challenges match, the proof validator service validates the proof and associated proof data using the circuit. Specifically, the circuit can output one or more true/false statements or values (e.g., 1 or 0). A true statement or value indicates that the TPM provided valid attestation data, the attestation data that was signed with a valid attestation identity key, and/or included a valid attestation identity key certificate. A false statement or value indicates that the prover service was not able to verify valid attestation data, the signature on the attestation data, and/or the attestation identity key certificate. The customer accepts the proof and/or attestation data when the circuit output comprises a true statement(s) or value(s).

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: (1) protecting private information linked to service provider infrastructure, which directly results in a reduction of computer resources required to monitor or investigate malicious behavior caused when a bad actor leverages private information linked to attestation data to compromise a host computing resource; (2) eliminates the necessity to expend computing resources to monitor for man in the middle attacks on attestation data that includes sensitive or private information of a related host computing resource and an online service provider; (3) improving the performance of computing devices by providing a computer-implemented process to provide attestation data, which eliminates prior human intervention that consumed compute resources when evaluating the security of attestation data that included sensitive or private information of the host computing resource and the online service provider; and so forth.

FIG. 1 illustrates a system environment 100, such as a host computing system, that implements the computer-implemented attestation process. In general, each of the blocks of the system environment 100 can be a computing device that includes at least one memory and one or more processing units (or processor(s)). Some or all of the blocks shown in the system environment 100 can be part of one or more common computing devices. The processor of each computing device can be implemented in hardware, computer-executable instructions, firmware, or combinations thereof. Computer-executable instructions or firmware implementations of the processor of each computing device can include computer-executable or machine-executable instructions written in any suitable programming language to perform the various described functions. Furthermore, in general, requests, messages, or other information or data communicated between computing devices disclosed herein can comprise data and have a format based on any number of standard protocols used to convey data across a network. For example, communications between the disclosed computing devices can be implemented with XML, HTTP, simple object access protocol (SOAP), representation state transfer (REST) techniques and technologies, and so forth. The requests, messages, or other information or data communicated between computing devices can be transmitted using wired and/or wireless connections and combinations thereof. In an embodiment, a network can be associated with such connections, where the network can include the Internet and/or other publicly addressable communications network, as the system environment 100 can include a web server for receiving requests and serving content in response thereto, although for other networks an alternative device serving a similar purpose could be used as would be apparent to one of ordinary skill in the art.

The system environment 100 can include a client computing device 102. The client computing device 102 can be part of a computer system associated with a customer. The customer can contract with an online service provider to obtain virtualized computing resources, such as scalable distributed storage, virtual servers, and database services. The client computing device 102 can generate an attestation request. In some implementations, the client computing device 102 generates the attestation request to confirm the trustworthiness and integrity of a virtual computing environment provided by the service provider. The virtual computing environment provided by the service provider can include one or more server computer systems, server clusters, virtual computer systems, or other host computer systems. The customer can impose various constraints on the host computer systems and the images installed on the virtual computing environments. The attestation request can be generated by the client computing device 102 to confirm that the service provider is complying with the various constraints imposed by the customer. The attestation request can include data or information specifying the one or more server computer systems, server clusters, virtual computer systems, or other host computer systems. As indicated, such systems are collectively or individually referred to herein as a host.

The client computing device 102 can also generate a client nonce. The client nonce can be a randomly generated value for single use. At 104, the client computing device 102 communicates the attestation request and the client nonce to an attestation endpoint 106. The attestation endpoint 106 can be implemented by the service provider. In some implementations, the attestation endpoint 106 is a computing device separate from a host 108 identified in the attestation request generated by the client computing device 102.

The attestation endpoint 106 evaluates the attestation request from the client computing device 102. The attestation endpoint 106, similar to other computing devices described herein, includes at least a processor and memory. The attestation endpoint 106 determines, based on the evaluation, that the customer, through the client computing device 102, is requesting attestation data related to the host 108. At 110, the attestation endpoint 106 forwards the obtained client nonce to a trusted platform module (TPM) 112 that is linked to the host 108. The attestation endpoint 106 may also forward a message, to the TPM 112, that contains some or all of the information contained in the attestation request and instructions that may aid in generating attestation data. For example, the message may include a request to obtain configuration information of the host 108, where the configuration information can be used to obtain or generate attestation data that includes attestation parameters that may include timestamp data, at least some of the configuration information, the client nonce, and so forth.

The TPM 112 can be part of a dongle or computer peripheral coupled to the host 108. In some implementations, the TPM 112 is integrated with the host 108, such as on an integrated circuit of the host 108. In general, the TPM 112 may be a secure enclave or computing region including secure storage and processors protected from external modification or tampering without proper credentials.

The TPM 112 is used to verify the integrity of the host 108. The TPM 112, specifically, is able to validate the hardware of the host 108 as well as the software installed on the host 108. The TPM 112 examines the system configuration of the host 108 and generates attestation data based on configuration data obtained from the host 108 at 114. In some implementations, the attestation data may include at least a portion of the configuration data obtained from the host 108. The configuration data can specify the hardware configuration of the host 108 as well as the software configuration installed on the host 108. In some implementations, the configuration data may identify the type of processor(s), memory, storage, general hardware, operating system, application(s), and/or other platform information of the host 108. The attestation data may include some or all of such configuration data received from the host 108.

The TPM 112 can link the attestation data to an attestation document, summarizing the hardware and software configuration of the host 108 that was derived from the configuration data obtained from the host 108. In some implementations, the attestation data and the attestation document are synonymous. The attestation data can confirm that the service provider has validated that the host 108 is a properly configured host computing device or computer system operated by the service provider, that the host computer system is hosting a valid virtual computer system(s), and that the virtual computer system(s) has a confirmed and valid operating environment, and so forth. Furthermore, the attestation data may include one or more attestation parameters including a timestamp when the attestation data was generated or obtained, information associated with the attestation request of the client computing device 102, the client nonce, identity information associated with a key(s) belonging to the TPM 112, such as an attestation identity key of the TPM 112, and/or some or all of the configuration data obtained from the host 108.

At 116, the TPM 112 obtains the attestation identity key from a key storage 118. The attestation identity key can be a certified private key. The certified private key can be used to sign data and other information. The key storage 118 can be integrated with the TPM 112, or the key storage 118 can be an external storage coupled to the TPM 112 via a network connection. In some implementations, the attestation identity key is a signing Rivest-Shamir-Adleman (RSA) key (comprising a certified private/public key pair) that is used to provide host authentication based on the attestation capability of the TPM 112. The attestation identity key allows the TPM 112 to produce cryptographically or digitally signed attestation data about the configuration and operational state of the host 108.

At 116, the TPM 112 also obtains an attestation identity key certificate. The certificate provides proof that the attestation identity key is a signing key belonging to the TPM 112 and usable to verify the integrity of the host 108. In some implementations, the attestation identity key certificate is issued by a trusted certification authority (CA) and includes a certificate chain to establish a chain of trust. In some implementations, the attestation identity key certificate identifies the TPM 112 and the host 108 associated with the TPM 112, includes a public portion of the attestation identity key (e.g., a public attestation identity key), such as a certified public key, owned by the TPM 112, provides a validity duration of the certificate, and includes a summary of operations for which the public portion of the attestation identity key is to be used (e.g., encrypting data, verifying digital signatures, and so forth). The TPM 112 may store the attestation identity key certificate or obtain the attestation identity key certificate from another computing device.

The TPM 112 signs the attestation data using the attestation identity key. The TPM 112 can also couple the attestation identity key certificate to the signed attestation data. The signature on the attestation data and/or the certificate to the attestation data can include information related to the TPM 112, service provider and the host 108 that the service provider does not wish to reveal to the customer that generated the attestation request.

At 120, the TPM 112 communicates the signed attestation data and the certificate to a prover service 122. In some implementations, the TPM 112 can be coupled to the prover service 122 implemented on a computing device, or the prover service 122 may be a dedicated computing device. The computing device that implements the prover service 122 can be the same computing device or host that implements the TPM 112, and the computing device can be part of the infrastructure provided by the service provider. In some implementations, the prover service 122 can be a zero-knowledge proof generating prover service. The prover service 122 can also obtain the client nonce from the TPM 112.

The prover service 122 can generate a proof that comprises proof data. The proof, and associated proof data, confirms that the attestation data received from the TPM 112 was signed with a valid attestation identity key held by the TPM 112. Furthermore, the proof confirms that the TPM 112 provided a valid attestation identity key certificate comprising a valid certificate chain establishing a chain of trust, and in some implementations, a valid public portion of the attestation identity key used to produce the signed attestation data. The proof, and associated proof data, can also confirm that the attestation data comprises host configuration data validated by the TPM 112 and/or valid attestation parameter(s) provided or generated by the TPM 112. The proof does not reveal anything about the signature on the attestation data. Moreover, the proof does not reveal anything about the attestation identity key certificate and/or information associated with the public portion of the attestation identity key. Furthermore, the proof does not reveal anything about the host configuration data validated by the TPM 112 and/or attestation parameter(s) provided or generated by the TPM 112. However, in some implementations, the proof can include associated non-sensitive data, such as non-sensitive information about the host 108.

In some implementations, the proof is a zero-knowledge proof generated by a zero-knowledge prover service (e.g., prover service 122). The proof can be an interactive or non-interactive zero-knowledge proof. The zero-knowledge proof can be generated with the aid of a proof program, also referred to as a circuit, of the prover service 122 that accepts private or secret inputs and generates a computation, that when included in the proof in encrypted form, shows that the program accepted the inputs as valid and was executed correctly, without revealing anything about the private or secret inputs or the execution of the program. For example, the zero-knowledge proof proves, by way proof data including an encrypted version of a computation that can be verified by the customer that obtains the proof, that the attestation data was signed with a valid attestation identity key held by the TPM 112. Furthermore, the proof confirms, by way of the encrypted version of a computation that can be verified by the customer that obtains the proof, that the TPM 112 provided a valid attestation identity key certificate comprising a valid certificate chain establishing a chain of trust, and in some implementations, provided a valid public portion of the attestation identity key used to produce the signed attestation data. The proof may also confirm, when verified, a validity of some or all of attestation parameters and/or configuration data included in the attestation data generated or provided by the TPM 112.

The prover service 122 can also use the client nonce obtained from the TPM 112 to generate a proof challenge. Specifically, the prover service 122 can generate a host nonce using a random nonce generator 136. The random nonce generator 136 can communicate the host nonce to the prover service 122 at 128. The host nonce can be a randomly generated value for single use. The prover service 122 combines the client nonce and the host nonce to generate the proof challenge. In some implementations, the prover service 122 combines the client nonce and the host nonce using a concatenation function common to the prover service 122 and a proof validator service 124 on a computer device of the customer. To enhance security, a cryptographic primitive can be applied to the output of the concatenation function to generate the proof challenge. The cryptographic primitive can be common to the prover service 122 and the proof validator service 124 on the computer device of the customer. The proof validator service 124, in some implementations, is a zero-knowledge proof validator service to validate zero-knowledge proofs.

At 126, the prover service 122 can communicate the proof and the proof challenge to the TPM 112. In some implementations, the prover service 122 can also communicate a scrubbed version of the signed attestation data to the TPM 112. The TPM 112 can, alternatively, generate the scrubbed version of the signed attestation data once the proof and the proof challenge are obtained from the prover service 122. In other implementations, the TPM 112 uses the unsigned attestation data as the scrubbed version of the attestation data. The scrubbed version of the attestation data does not include information or data identified by the service provider as sensitive or private information or data, such as a name of the host 108, identifying information of the TPM 112, and so forth.

At 126, the prover service 122 can also communicate a circuit that was used by the prover service 122 to generate the proof and associated proof data. The circuit, at 130, can be obtained from a circuit generator 132. The circuit can also be used by the customer to verify the proof generated by the prover service 122. Specifically, the circuit when used to validate the proof produces data, such as one or more output values, that is associated with the proof and related proof data provided by the prover service 122.

The proof and the associated proof data can be used by the TPM 112 and/or attestation endpoint 106 to confirm to the customer that the attestation identity key used to sign attestation data satisfies a certain set of relationships confirmed by the circuit, without revealing to the customer private or secret information associated with the signature. Furthermore, the proof and the associated proof data can be used by the TPM 112 and/or attestation endpoint 106 to confirm to the customer that a valid attestation identity key certificate comprising a valid certificate chain establishing a chain of trust, and in some implementations, a valid public portion of the attestation identity key, satisfy a certain set of relationships confirmed by the circuit, without revealing to the customer private or secret information associated with the certificate and the public portion of the attestation identify key. In addition, the proof and the associated proof data can be used by the TPM 112 and/or attestation endpoint 106 to confirm to the customer that the attestation data included valid configuration data of the host and/or valid attestation parameters generated by the TPM 112. The data provided by the circuit can be one or more output values indicating whether or not the TPM 112 provided valid attestation data that was signed with a valid attestation identity key and included a valid attestation identity key certificate. Specifically, the circuit can output one or more true/false statements or values (e.g., 1 or 0). A true statement or value indicates that the TPM 112 provided valid attestation data that was signed with a valid attestation identity key and included a valid attestation identity key certificate. A false statement or value indicates that the prover service 122 was not able to verify the signature on the attestation data, the attestation data, and/or the attestation identity key certificate. However, the output of one or more true statements or values and the absence of false statements or values may not result in the acceptance of related attestation data, such as scrubbed attestation data, as valid. For example, despite the output of one or more true statements or values, a customer may reject a validated proof because some or all of the scrubbed attestation data is unacceptable to the customer.

In some implementations, the circuit is mutually agreed upon by the customer and the service provider that implements the prover service 122. For example, the circuit can be obtained or otherwise received by the customer before TPM 112 generates the signed attestation data. Similarly, the circuit can be obtained by the service provider before the proof is provided to the customer. In some implementations, the service provider, as indicated in the foregoing, can communicate the circuit to the customer subsequent to receiving the attestation request. In some implementations, the circuit can be generated by the service provider or a trusted third-party proving circuit provider.

Having obtained or otherwise received the proof, the proof challenge and the host nonce at 126, the TPM 112 at 134 communicates attestation data to the attestation endpoint 106. The attestation data may be scrubbed attestation data that does not reveal sensitive or confidential information. The scrubbed attestation data can be communicated in an attestation document or message. The scrubbed attestation data does not reveal information related to the TPM 112 or information related to the host 108. The TPM 112 at 134 also communicates a proof package that includes the proof, the proof challenge, and the host nonce to the attestation endpoint 106. In some implementations, the TPM 112 includes the circuit in the proof package. In some implementations, the TPM 112 foregoes communicating the scrubbed attestation data in favor of simply communicating the proof package. Specifically, some customers may only require the proof to confirm the validity of the attestation data obtained or generated by the TPM 112.

The attestation endpoint 106, at 136, communicates the proof, the proof challenge, and the host nonce to the customer. In some implementations, at 136, the attestation endpoint 106 also communicates the circuit to the client computing device 102, if the client computing device 102 does not already possess the circuit. At 136, in some implementations, the attestation endpoint 106 can communicate the attestation data to the customer that generated the attestation request. Specifically, the attestation data can be communicated to the client computing device 102 belonging to the customer. The attestation data does not include sensitive or private data of the online service provider. Thus, the attestation data may be scrubbed attestation data generated by the TPM 112 and/or the prover service 122.

The proof validator service 124, which can be a zero-knowledge proof validator service, receives or obtains the host nonce and the proof challenge. The proof validator service 124 uses the client nonce, which is stored in the computing device 102, and the host nonce to generate a proof validator challenge. The proof validator service 124 combines the client nonce and the host nonce to generate the proof validator challenge. In some implementations, the proof validator service 124 combines the client nonce and the host nonce using a concatenation function common to the prover service 122 and the proof validator service 124. To enhance security, a cryptographic primitive can be applied to the output of the concatenation function to generate a proof validator challenge. The cryptographic primitive can be common to the prover service 122 and the proof validator service 124.

The proof validator service 124 confirms that the proof validator challenge matches the proof challenge obtained from the attestation endpoint 106. Validation of the proof fails and the attestation data, if provided, is disregarded when the challenges do not match. When the challenges match, the proof validator service 124 validates the proof and associated proof data using the circuit. Specifically, the circuit can output one or more true/false statements or values (e.g., 1 or 0). A true statement or value indicates that the TPM 112 provided valid attestation data that was signed with a valid attestation identity key and included a valid attestation identity key certificate. A false statement or value indicates that the prover service 122 was not able to verify the attestation data, the signature on the attestation data and/or the attestation identity key certificate. The customer can accept that the TPM 112 generated attestation data when the circuit output comprises a true statement(s) or value(s).

Figure 2:
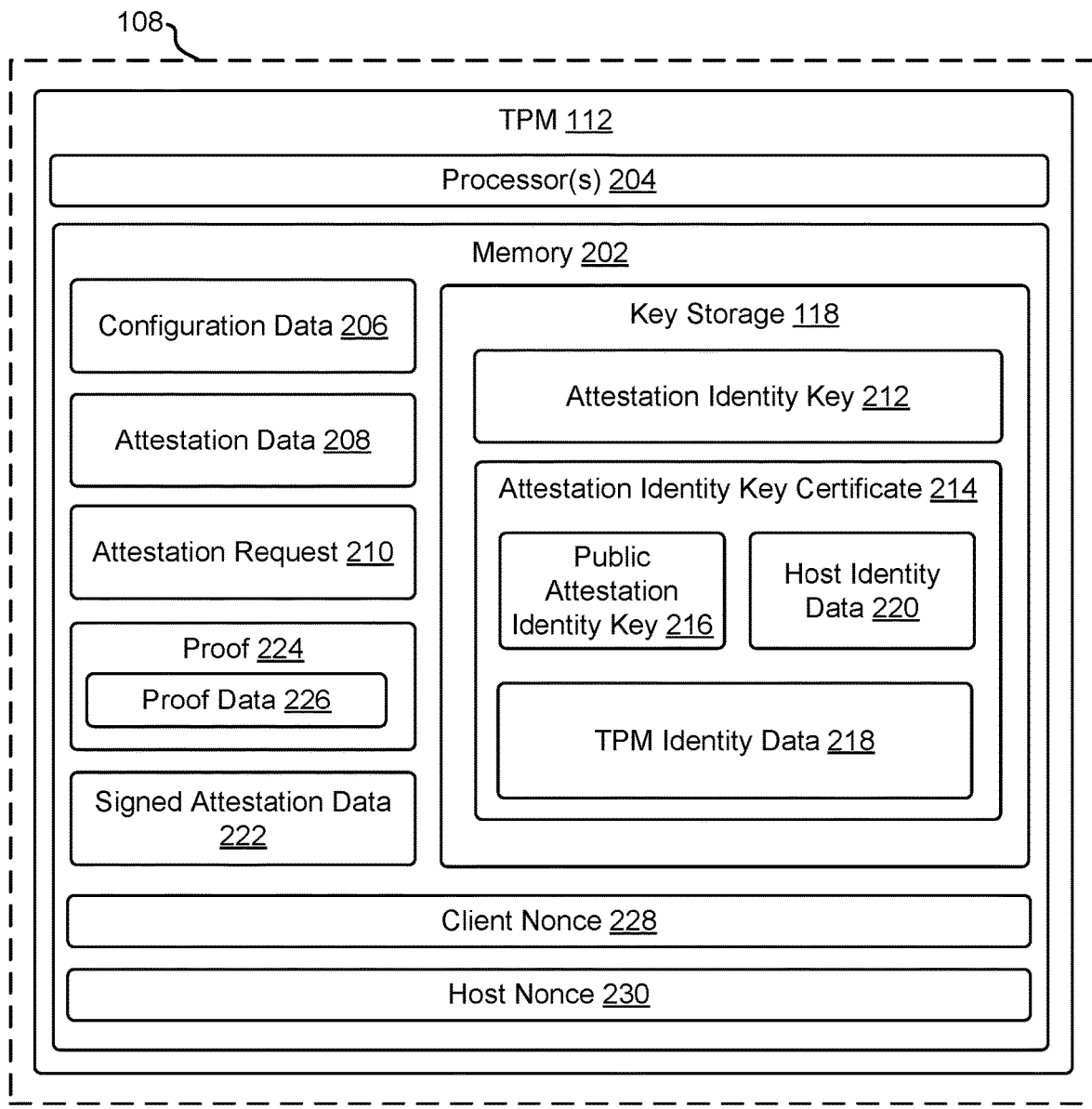
FIG. 2 illustrates details associated with a trusted platform module (TPM) that can be used to obtain attestation data from a host and to provide attestation data to an online service provider.

FIG. 2 illustrates details associated with the TPM 112 that can be used to obtain attestation data from the host 108 and to provide a proof of valid attestation data to an online service provider. In some configurations, the TPM 112 can include at least one memory 202 and one or more processing units (or processor(s)) 204. The processor 204 can be implemented as appropriate in hardware, computer-executable instructions, firmware, or combinations thereof. Computer-executable instructions or firmware implementations of the processor 204 can include computer-executable or machine-executable instructions written in any suitable programming language to perform the various described functions. In some implementations, as illustrated, the TPM 112 is part of the host 108. Specifically, the TPM 112 can be embodied as an integrated circuit coupled to the host 108, a peripheral card coupled to the host 108, a dongle coupled to the host 108, a module stored in the host 108, a separate computing device securely networked to the host 108, and so forth. In general, TPM 112 is a hardware device comprising a secure cryptoprocessor and associated memory that provides support for encryption, decryption, a key generation, and other cryptographic operations in a protected tamper-resistant environment.

The memory 202 can store program instructions that are loadable and executable on the processor 204, as well as data generated or used during the execution of these program instructions. Depending on the configuration of the TPM 112, the memory 202 can be volatile (such as random access memory (RAM)) and/or non-volatile (such as read-only memory (ROM), flash memory, etc.). The TPM 112 can also include additional storage, which can include removable storage and/or non-removable storage. The additional storage can include, but is not limited to, magnetic storage, optical disks and/or tape storage. The disk drives and their associated computer-readable media can provide non-volatile storage of computer-readable instructions, data structures, program modules, program services and other data for the TPM 112. In some implementations, the memory 202 can include multiple different types of memory, such as static random access memory (SRAM), dynamic random access memory (DRAM), or ROM.

The TPM 112 can also contain communications connection(s) that allows the TPM 112 to communicate with the host 108, another computing device or server, user terminals and/or other devices on networks, such as networks associated with the online service provider and/or other networks external to the online service provider. The TPM 112, when embodied as a computing device coupled to the host 108, can also include input/output (I/O) device(s), such as a keyboard, a mouse, a pen, a voice input device, a touch input device, a display, speakers, a printer, etc. Furthermore, the TPM 112 can be implemented as a laptop computer, mobile device, and/or desktop computer. The TPM 112 can take other forms as well.

In some implementations, the host 108 includes installed one or more host images and is configured to act as a host for virtual computing environments provided by the service provider. The service provider uses the TPM 112 to confirm the proper configuration of the host 108. In some implementations, the TPM 112 uses configuration data 206 obtained from the host 108 and generates a checksum of the software and hardware configuration based on the configuration data 206. In some implementations, the checksum is confirmed against a database of approved checksums maintained by the service provider. In some implementations, the TPM 112 ensures that only applications signed by an approved authority are executed on the host 108.

The TPM 112 can use the configuration data 206 provided by the host 108 to generate attestation data 208. In some implementations, the attestation data 208 is generated in response to an attestation request 210, which can have been received or obtained from the client computing device 102. The attestation data 208 can be used to indicate that the service provider, aided by the TPM 112, has confirmed that the host 108 is a properly configured host computer system operated by the service provider, that the host 108 is hosting the valid virtual computer system, that the virtual computer system has confirmed a valid operating environment, and so forth. The attestation data 208 can also be referred to as scrubbed attestation data 208, as the attestation data 208 has not been signed by the TPM 112 when it is initially generated by the TPM 112 and does not include private or sensitive information. In some implementations, the TPM 112 generates scrubbed attestation data by removing private or sensitive information contained in the configuration data 206 and/or generated by the TPM 112 in the process of producing the attestation data 208. For example, the TPM 112 may generate the attestation data 208 to include one or more attestation parameters including a timestamp when the attestation data 208 was generated, information associated with the attestation request 210, the client nonce 228, configuration data 206 of the host 108, and/or identity information associated with a key belonging to the TPM 112, such as an attestation identity key 212. Some or all of the attestation parameters may be removed from the attestation data 208 to provide a scrubbed version of the attestation data 208. As disclosed, in some implementations, the scrubbed version of the attestation data 208 may be provided to the customer with the proof 224 and associated proof data 226. In some implementations, the scrubbed version of the attestation data 208 is generated by the prover service 122 after obtaining the attestation data 208 from the TPM 112.

The TPM 112 can store the attestation identity key 212 in the memory 202. Specifically, the attestation identity key 212 can be stored in the key storage 118 associated with the memory 202. In some implementations, the attestation identity key 212 is an RSA key (comprising a certified private/public key pair) that is used to provide host authentication based on the attestation capability of the TPM 112. The attestation identity key 212 allows the TPM 112 to produce signed attestation data about the configuration and operational state of the host 108. In some implementations, the attestation identity key 212 is simply a certified private key that can be used to sign data and information.

The TPM 112 can also store an attestation identity key certificate 214 in the memory 202. In some implementations, the attestation identity key certificate 214 is stored in the key storage 118 associated with the memory 202. The certificate 214 provides proof that the attestation identity key 212 is a signing key belonging to the TPM 112 and usable in verifying the integrity of the host 108. In some implementations, the attestation identity key certificate 214 identifies the TPM 112 and the host 108 associated with the TPM 112, includes a public portion of the attestation identity key (e.g., a public attestation identity key 216), such as a certified public key, owned by the TPM 112. Therefore, the attestation identity key certificate 214 can include the public attestation identity key 216, TPM identity data 218, and host identity data 220.

In some implementations, the TPM 112 uses the attestation identity key 212 to sign the attestation data 208. Signing the attestation data 208 generates signed attestation data 222. The signed attestation data 222 and/or the attestation identity key certificate 214 data can include information related to the TPM 112, service provider, and the host 108, which the service provider does not wish to reveal to the customer that generated the attestation request 210.

The TPM 112 also comprises a proof 224, provided by the prover service 122, that in some implementations comprises proof data 226. The proof 224, and associated proof data 226, confirms that the attestation data 208 is valid and that the signed attestation data 222 was signed with the attestation identity key 212 held by the TPM 112. Furthermore, the proof 224 confirms that the TPM 112 provided the identity key certificate 214 comprising a valid certificate chain establishing a chain of trust, and in some implementations, the public portion of the attestation identity key 216 used to produce the signed attestation data 222. The proof 224 does not reveal anything about data or information contained in the attestation data 208 or the signature on the signed attestation data 222. Moreover, the proof 224 does not reveal anything about the attestation identity key certificate 214 and/or information associated with the public attestation identity key 216. In some implementations, the proof 224 may include some or all of the scrubbed attestation data 208.

In some implementations, the proof 224 is a zero-knowledge proof generated by a zero-knowledge prover service (e.g., prover service 122). The proof 224 can be an interactive or non-interactive zero-knowledge proof. The zero-knowledge proof 224 can be generated by a proof program of the prover service 122 that accepts private or secret inputs and generates a proof that proves to the customer that the program accepted the inputs as valid and executed correctly, without revealing anything about the private or secret inputs or the execution of the program. For example, the zero-knowledge proof 224 proves, by way proof data 226 including an encrypted version of a computation that can be verified by the customer that obtains the proof 224, that the attestation data 208 including the one or more parameters is valid and was signed with the attestation identity key 212 held by the TPM 112. Furthermore, the proof 224 confirms, by way of the encrypted version of a computation that can be verified by the customer that obtains the proof 224, that the TPM 112 provided the attestation identity key certificate 214 comprising a valid certificate chain establishing a chain of trust, and in some implementations, provided the public portion of the attestation identity key 216 used to produce the signed attestation data 222.

As disclosed, the TPM 112 also includes the client nonce 228 and a host nonce 230. The client nonce 228 is obtained or received from the client computing device 102. The host nonce 230 is obtained or received from the prover service 122.

Figure 3:
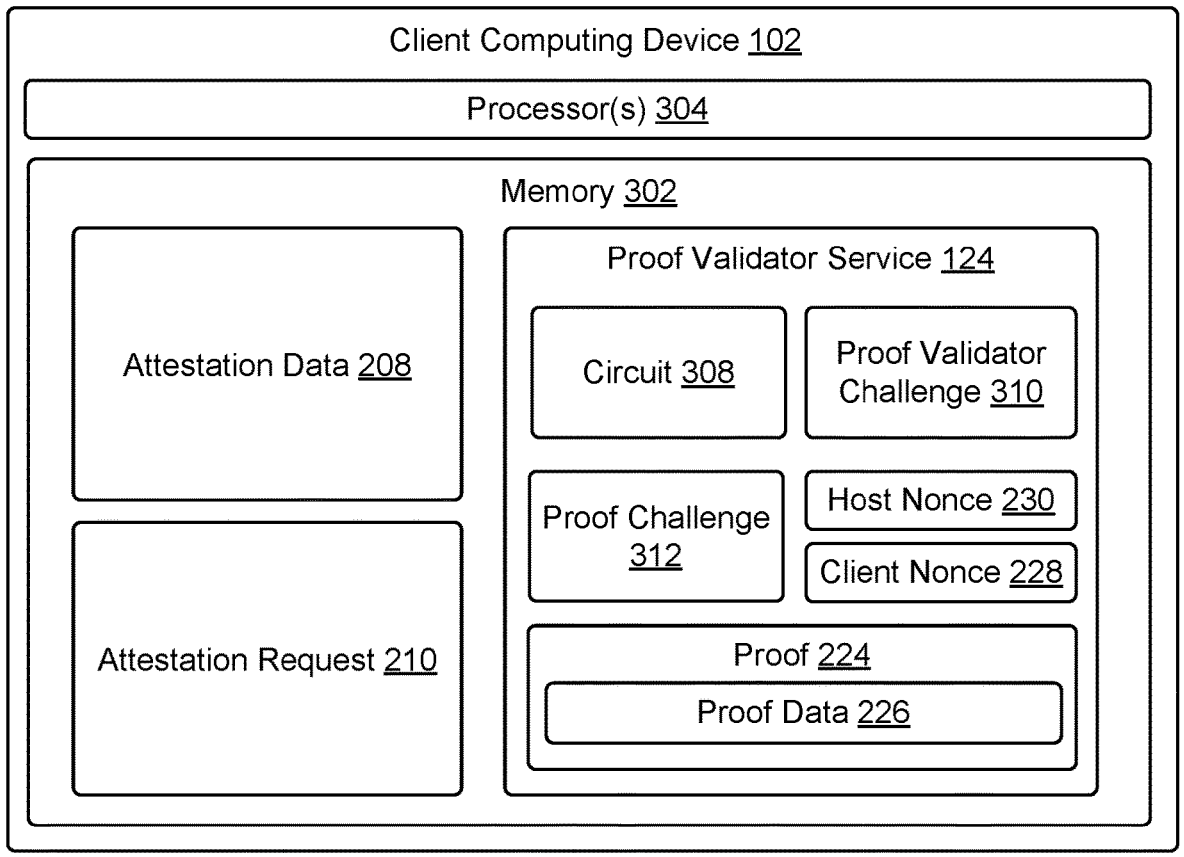
FIG. 3 illustrates details associated with a client computing device that can obtain at least a proof from an attestation endpoint and the TPM of the system environment.

FIG. 3 illustrates details associated with the client computing device 102 that can obtain at least the proof 224 from the attestation endpoint 106. In some configurations, the client computing device 102 can include at least one memory 302 and one or more processing units (or processor(s)) 304. The processor 304 can be implemented as appropriate in hardware, computer-executable instructions, firmware, or combinations thereof. Computer-executable instructions or firmware implementations of the processor 304 can include computer-executable or machine-executable instructions written in any suitable programming language to perform the various described functions.

The memory 302 can store program instructions that are loadable and executable on the processor 304, as well as data generated or used during the execution of these program instructions. Depending on the configuration of the client computing device 102, the memory 302 can be volatile (such as random access memory (RAM)) and/or non-volatile (such as read-only memory (ROM), flash memory, etc.). The client computing device 102 can also include additional storage, which can include removable storage and/or non-removable storage. The additional storage can include, but is not limited to, magnetic storage, optical disks and/or tape storage. The disk drives and their associated computer-readable media can provide non-volatile storage of computer-readable instructions, data structures, program modules, program services and other data for the client computing device 102. In some implementations, the memory 302 can include multiple different types of memory, such as static random access memory (SRAM), dynamic random access memory (DRAM), or ROM.

The client computing device 102 can also contain communications connection(s) that allows the client computing device 102 to communicate with one or more elements of the system environment 100, another computing device or server, user terminals and/or other devices on networks, such as networks associated with the online service provider and/or other networks external to the online service provider. The client computing device 102 can also include input/output (I/O) device(s), such as a keyboard, a mouse, a pen, a voice input device, a touch input device, a display, speakers, a printer, etc. Furthermore, the client computing device 102 can be implemented as a laptop computer, mobile device, and/or desktop computer. The client computing device 102 can take other forms as well.

The client computing device 102, as disclosed, generates the attestation request 210. The attestation request 210 is generated to confirm the trustworthiness and integrity of a virtual computing environment provided by the service provider. The virtual computing environment can include the host 108. The customer can impose various constraints on the host 108 and the images installed on the host 108. The client computing device 102 can obtain the attestation data 208 in response to the attestation request 210. The attestation data 208 can be scrubbed such that at least private or sensitive information of the service provider is not included with the attestation data 208. Furthermore, as previously disclosed, the client computing device 102 also obtains the proof 224 in response to the attestation request 210. The proof 224 can include the proof data 226.

The client computing device 102 implements the proof validator service 124. The proof validator service 124 can store the proof 224 and the proof data 226. In some implementations, the proof 224 and the proof data 226 can be stored by the memory 302 external of the proof validator service 124. In some implementations, the proof validator service 124 stores the host nonce 230 and can be used to generate the client nonce 228 included with the attestation request 104. For example, the proof validator service 124 can implement a random nonce generator, similar to the random nonce generator 138, that generates the client nonce 228.

The proof validator service 124 can also obtain the proof challenge 312 generated by the prover service 122. The proof validator service 124 can be a zero-knowledge proof validator service. The proof validator service 124 can generate the proof validator challenge 310 from at least the host nonce 230 and the client nonce 228. The proof validator service 124 combines the client nonce 228 and the host nonce 230 to generate the proof validator challenge 310. In some implementations, the proof validator service 124 combines the client nonce 228 and the host nonce 230 using a concatenation function common to the prover service 122 and the proof validator service 124. To enhance security, a cryptographic primitive can be applied to the output of the concatenation function to generate the proof validator challenge 310. The cryptographic primitive can be common to the prover service 122 and the proof validator service 124.

The proof validator service 124 confirms that the proof validator challenge 310 is equal to the proof challenge 312. Validation of the proof 224 fails and, when provided, the attestation data 208 is disregarded when the challenges do not match. When the challenges match, the proof validator service 124 validates the proof 224 and associated proof data 226 using the circuit 308. Specifically, the circuit 308 can output one or more true/false statements or values (e.g., 1 or 0). A true statement or value indicates that the TPM 112 generated valid attestation data 208, provided signed attestation data 208 that was signed with the attestation identity key 212, and included the attestation identity key certificate 214. A false statement or value indicates that the prover service 122 was not able to verify valid attestation data 208, the signature on the signed attestation data 222, and/or the attestation identity key certificate 214. In some implementations, the customer accepts the attestation data 208 when the circuit 308 output comprises a true statement(s) or value(s). The circuit 308, in some implementations, is provided by the prover service 122. In other implementations, the circuit 308 is obtained from a trusted third party agreed to by the customer and the service provider.

Figure 4:
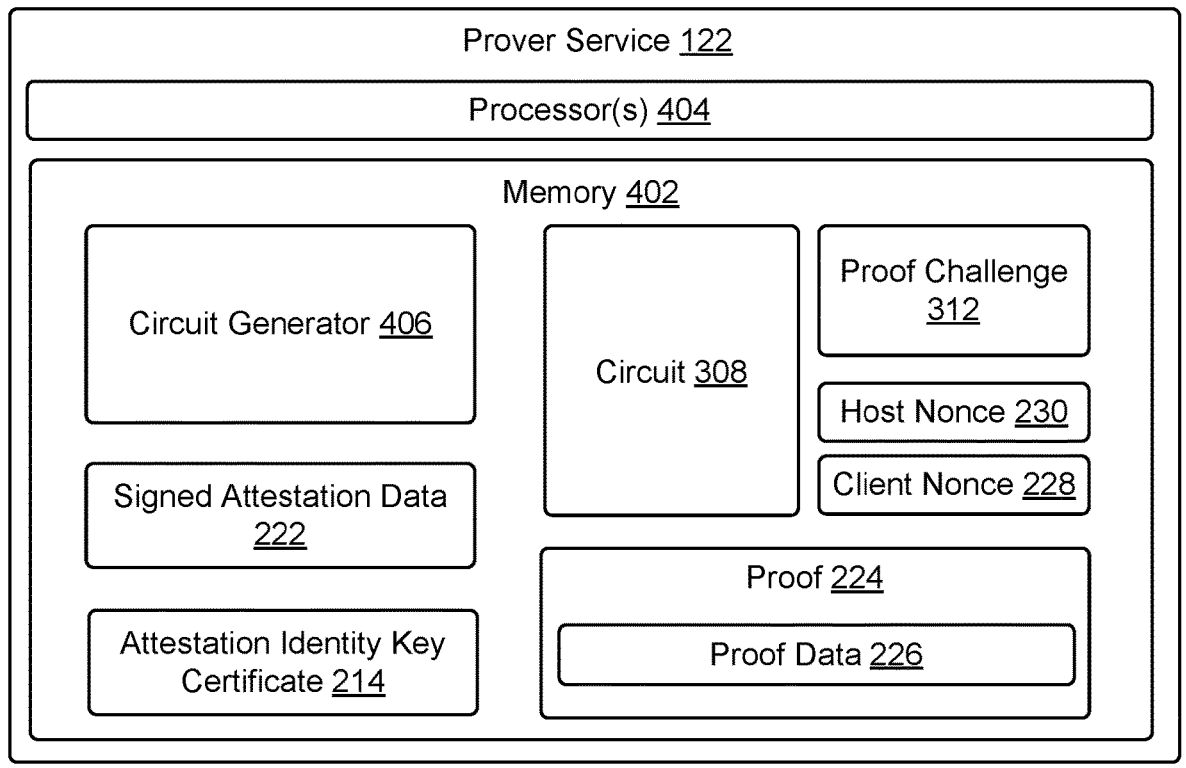
FIG. 4 illustrates details associated with a prover that can generate at least the proof provided to the client computing device via, in some implementations, the TPM and the attestation endpoint of the system environment.

FIG. 4 illustrates details associated with the prover service 122 that can generate at least the proof 224, and associated proof data 226, provided to the client computing device 102 via, in some implementations, the TPM 112 and the attestation endpoint 106. In some implementations, the proof 224, and associated proof data 226, is communicated to the client computing device 102 directly or via another computing device of the service provider or external of the service provider. In some configurations, the client computing device 102 can include at least one memory 402 and one or more processing units (or processor(s)) 404. The processor 404 can be implemented as appropriate in hardware, computer-executable instructions, firmware, or combinations thereof. Computer-executable instructions or firmware implementations of the processor 404 can include computer-executable or machine-executable instructions written in any suitable programming language to perform the various described functions.

The memory 402 can store program instructions that are loadable and executable on the processor 404, as well as data generated or used during the execution of these program instructions. Depending on the configuration of the prover service 122, the memory 402 can be volatile (such as random access memory (RAM)) and/or non-volatile (such as read-only memory (ROM), flash memory, etc.). The prover service 122 can also include additional storage, which can include removable storage and/or non-removable storage. The additional storage can include, but is not limited to, magnetic storage, optical disks and/or tape storage. The disk drives and their associated computer-readable media can provide non-volatile storage of computer-readable instructions, data structures, program modules, program services and other data for the prover service 122. In some implementations, the memory 402 can include multiple different types of memory, such as static random access memory (SRAM), dynamic random access memory (DRAM), or ROM.

The prover service 122 can also contain communications connection(s) that allows the prover service 122 to communicate with one or more elements of the system environment 100, another computing device or server, user terminals and/or other devices on networks, such as networks associated with the online service provider and/or other networks external to the online service provider. The prover service 122 can also include input/output (I/O) device(s), such as a keyboard, a mouse, a pen, a voice input device, a touch input device, a display, speakers, a printer, etc. Furthermore, the prover service 122 can be implemented as a laptop computer, mobile device, and/or desktop computer. The prover service 122 can take other forms as well.

The prover service 122 obtains or receives the signed attestation data 222 and the attestation identity key certificate 214. In some implementations, the signed attestation data 222 and the attestation identify key certificate 214 are received from the TPM 112. The prover service 122 also obtains or receives the client nonce 228. In some implementations, the TPM 112 provides the client nonce 228. In other implementations, the client computing device 102 or the attestation endpoint 106 provides the client nonce 228.

The prover service 122 can generate the proof 224 that comprises the proof data 226. The proof 224, and associated proof data 226, confirms that the attestation data 208 and included parameters and/or configuration data 206 are valid and that the attestation data 208 was signed with the attestation identity key 212 held by the TPM 112. Furthermore, the proof 224 confirms that the TPM 112 provided a valid attestation identity key certificate 214 comprising a valid certificate chain establishing a chain of trust, and in some implementations, a valid public portion of the attestation identity key 216 used to produce the signed attestation data 222. The proof 224 does not reveal anything about the attestation data 208 and the signature on the attestation data 222. Moreover, the proof 224 does not reveal anything about the attestation identity key certificate 214 and/or information associated with the public portion of the attestation identity key 216. However, in some implementations, the proof 224 may include non-sensitive data, such as some or all of the data in the scrubbed version of the attestation data 208.

In some implementations, the proof 224 is a zero-knowledge proof generated by a zero-knowledge prover service (e.g., prover service 122). The proof 224 can be an interactive or non-interactive zero-knowledge proof. The zero-knowledge proof can be generated with the aid of a proof program, also referred to herein as a circuit (e.g., circuit 308), that accepts private or secret inputs and generates a computation. The computation can be encrypted and included with or as part of the proof, where the computation can be used to confirm that the program accepted the inputs as valid and was executed correctly, without revealing anything about the private or secret inputs or the execution of the program. For example, the zero-knowledge proof proves, by way proof data (e.g., proof data 226) including an encrypted version of a computation that can be verified by the customer that obtains the proof 224, that valid attestation data 208 was obtained, the attestation data 208 was signed with a valid attestation identity key 212 held by the TPM 112. Furthermore, the proof 224 confirms, by way of the encrypted version of a computation that can be verified by the customer that obtains the proof 224, that the TPM 112 or some other computing device provided a valid attestation identity key certificate 214 comprising a valid certificate chain establishing a chain of trust, and in some implementations, provided a valid public portion of the attestation identity key 216 used to produce the signed attestation data 222.

The prover service 112 can also use the client nonce 228 to generate the proof challenge 312. Specifically, the prover service 112 can generate the host nonce 230. Similar to the client nonce 228, the host nonce 230 can be a randomly generated value for single use. The prover service 122 combines the client nonce 228 and the host nonce 230 to generate the proof challenge 312. In some implementations, the prover service 122 combines the client nonce 228 and the host nonce 230 using a concatenation function common to the prover service 122 and the proof validator service 124 on the computer device 102 of the customer. To enhance security, a cryptographic primitive can be applied to the output of the concatenation function to generate the proof challenge 312. The cryptographic primitive can be common to the prover service 122 and the proof validator service 124 on the computer device 102 of the customer.

The prover service 122 can communicate the proof 224 and the proof challenge 312 to the TPM 112. In some implementations, the prover service 122 can also communicate a scrubbed version of the signed attestation data 222 to the TPM 112. The scrubbed version of the signed attestation data 222 can be generated by removing the signature from the signed attestation data 222 and/or removing identifying information of the service provider, the host 108, and the TPM 112. In general, the scrubbed version of the signed attestation data 222 is the same or similar to the attestation data 208 generated by the TPM 112. Accordingly, in some implementations, TPM 112 can generate the scrubbed version of the attestation data 208 once the proof 224 and the proof challenge 312 are obtained from the prover service 122. In some implementations, the scrubbed version of the attestation data 208 is a copy of the attestation data 208 with sensitive and private data and information removed to protect the privacy of the service provider.

The prover service 122 can generate the circuit 308 using a circuit generator 406. The prover service 122 can communicate the circuit 308 that was used by the prover service 122 to generate the proof 224. The circuit 308 when used to validate the proof 224 can be used by the customer to verify the proof 224 generated by the prover service 122. Specifically, the circuit 308 produces data, such as one or more output values, that is associated with the proof 224 and related proof data 226 provided by the prover service 224. The proof 224 and the associated proof data 226 can be used by the TPM 112 and/or attestation endpoint 106, or some other computing device, to confirm to the customer that the attestation identity key 212 used to signed attestation data 222 satisfies a certain set of relationships confirmed by the circuit 308, without revealing to the customer private or secret information associated with the attestation data 208 and the signature of the attestation identity key 212. Furthermore, the proof 224 and the associated proof data 226 can be used by the TPM 112 and/or attestation endpoint 106, or some other computing device, to confirm to the customer that a valid attestation identity key certificate 214 comprising a valid certificate chain establishing a chain of trust, and in some implementations, a valid public portion of the attestation identity key 216, satisfy a certain set of relationships confirmed by the circuit 308, without revealing to the customer private or secret information associated with the certificate 214 and the public portion of the attestation identify key 216. The data provided by the circuit 308 can be one or more output values indicating whether or not the TPM 112 provided to the prover service 122 valid attestation data 208 and attestation data 208 that was signed with a valid attestation identity key 212 and included a valid attestation identity key certificate 214. Specifically, the circuit 308 can output one or more true/false statements or values (e.g., 1 or 0). A true statement or value indicates that the TPM 112 provided valid attestation data 208 and included valid attestation parameters and/or configuration data 206, and that the attestation data 208 was signed with the attestation identity key 212 and included the attestation identity key certificate 214. A false statement or value indicates that the prover service 112 was not able to verify valid attestation data 208, the signature on the attestation data 222, and/or the attestation identity key certificate 214. However, the output of one or more true statements or values and the absence of false statements or values may not result in the acceptance of related attestation data, such as the scrubbed attestation data 208, as valid. For example, despite the output of one or more true statements or values, a customer may reject a validated proof because some or all of the scrubbed attestation data 208 is unacceptable to the customer.

In some implementations, the circuit 308 is mutually agreed upon by the customer and the service provider that implements the prover service 122. For example, the circuit 308 can be obtained or otherwise received by the customer before the TPM 112 generates the attestation data 208. Similarly, the circuit 308 can be obtained by the service provider before the proof 224 is provided to the customer. In some implementations, the service provider, as indicated in the foregoing, can communicate the circuit 308 to the customer subsequent to receiving the attestation request 210. In some implementations, the circuit 308 can be generated by the service provider or a trusted third-party proving circuit provider. Therefore, in some implementations, the trusted third-party proving circuit provider can implement the circuit generator 406.

Figure 5:
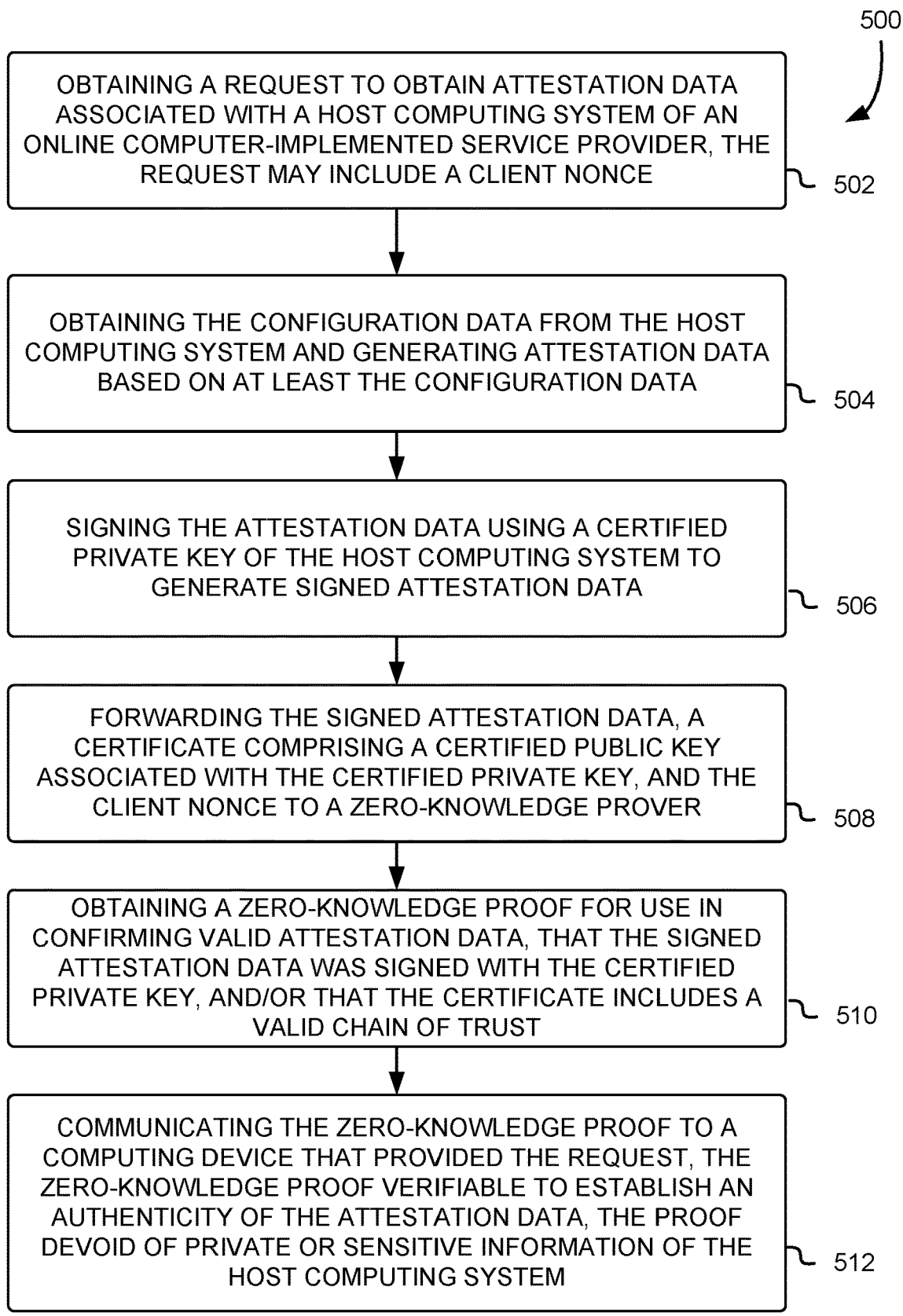
FIG. 5 illustrates a flow diagram including various processing acts, implemented by a system environment with one or more computing devices, which provide attestation data.

FIG. 5 illustrates a flow diagram 500 including various processing acts, implemented by a system environment with one or more computing devices, which provide attestation data. In some implementations, the acts of the flow diagram 500 are executed by one or more computing devices illustrated in FIGS. 1-4 and 7. The illustrated computing devices may execute computer-executable instructions incorporating at least some of the processing acts of the flow diagram 500 to provide attestation data and an associated proof to a customer of an online service provider.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, as used in the description and claims, is used expansively herein to include routines, applications, application modules, program modules, system modules, programs, components, data structures, algorithms, and the like. Computer-readable instructions can be implemented on various system configurations, including single-processor or multiprocessor systems, minicomputers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 502, a request to obtain attestation data is obtained by an online computer-implemented service provider. In some implementations, the request is obtained by the attestation endpoint 106 of the service provider. The request can include a client nonce generated by a client computing device associated with a customer of the service provider. For example, the client computing device 102, belonging to the customer, can generate the client nonce. In some implementations, the client computing device 102 also generates the attestation request.

At 504, the requested configuration data is obtained or generated by the service provider. In some implementations, a host computing system of the service provider, such as the TPM 112, generates the attestation data based on configuration data obtained from a host computing device of the service provider. For example, the host 108 can provide the configuration data to the TPM 112. The TPM 112 can generate the attestation data based on the configuration data provided by the host computing device. The attestation data may include additional data, such as one or more attestation parameters generated by the TPM 112 or derived from the configuration data. One or more of the attestation parameters may include at least a portion of the configuration data. For example, one or more of the attestation parameters may include data describing the hardware, software, application(s), platform(s), and so forth, implemented by the host computing device. The attestation parameters of the attestation data may also include other parameters, such as a timestamp indicating when the attestation data was generated, and/or identifying information pertaining to the TPM, the host computing device, the service provider, one or more keys of the TPM, and so forth.

At 506, the attestation data is signed to generate signed attestation data. In some implementations, the TPM 112 signs the attestation data using a certified private key, such as the attestation identity key 212.

At 508, the signed attestation data is forwarded to a prover service. The prover service may be a zero-knowledge prover service capable of providing zero-knowledge proofs. For example, the signed attestation data may be forwarded it to the prover service 122. In addition, the prover service 122 may receive a certificate including a certified public key linked to the certified private key used to sign the attestation data.

At 510, a zero-knowledge proof is obtained. In some implementations, the zero-knowledge proof is obtained from the prover service 122. The zero-knowledge proof may comprise proof data, such as the proof data 226. The zero-knowledge proof can verify the validity of the attestation data, that the signed attestation data was signed with the certified private key, and/or that the certificate comprising the certified public key includes a valid chain of trust.

At 512, the zero-knowledge proof and, in some implementations, attestation data are communicated to a computing device. Specifically, the TPM 112, aided by the attestation endpoint 106, can communicate at least the zero-knowledge proof to the client computing device 102. The client computing device 102, using the proof validator service 124, can verify the zero-knowledge proof to establish an authenticity of the attestation data. Specifically, the proof data is devoid of private or sensitive information of the host computing system.

Figure 6:
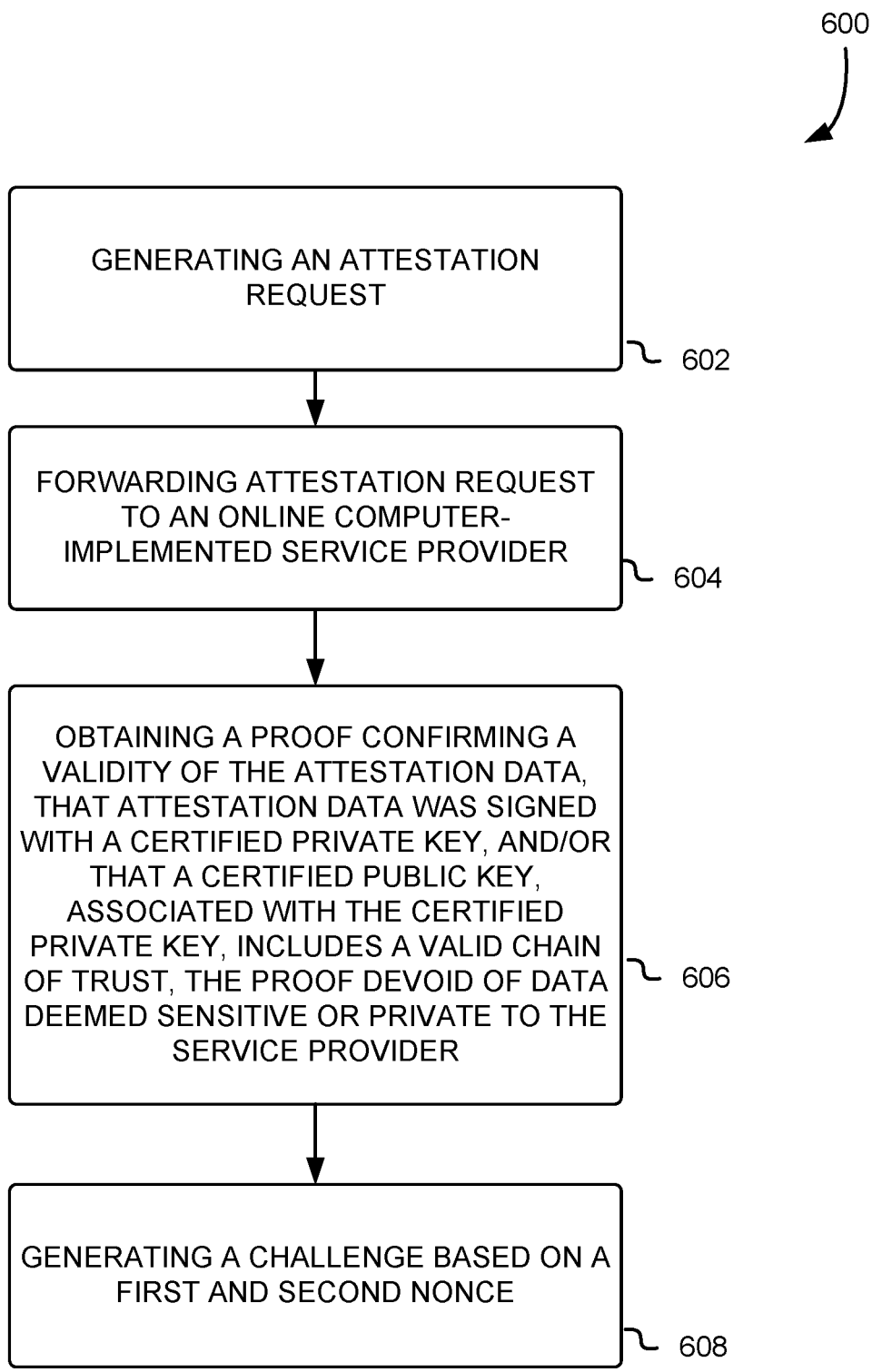
FIG. 6 illustrates a flow diagram including various processing acts, implemented by a system environment with one or more computing devices, which obtain attestation data.

FIG. 6 illustrates a flow diagram 600 including various processing acts, implemented by a system environment with one or more computing devices, which obtain attestation data. In some implementations, the acts of the flow diagram 600 are executed by one or more computing devices illustrated in FIGS. 1-4 and 7. The illustrated computing devices may execute computer-executable instructions incorporating at least some of the processing acts of the flow diagram 600 to obtain, by a customer of an online service provider, attestation data and an associated proof.

At 602, an attestation request is generated. In some implementations, a customer computing device, such as the client computing device 102, generates the attestation request for communication to the online service provider. The customer may contract with the online service provider to obtain online the computing and storage resources.

At 604, the computing device forwards the attestation request to the online service provider. In some implementations, the attestation endpoint 106 of the service provider receives the attestation request.

At 606, a proof is obtained. In some implementations, the client computing device 102 obtained proof from the attestation endpoint 106 and the TPM 112 of the online service provider. In some implementations, the proof is a zero-knowledge proof generated by the prover service 122 of the online service provider. The proof may be validated, using for example the proof validator service 124, to confirm a validity of attestation data, that attestation data was signed with a certified private key, and/or that a certified public key, associated with the certified private key, includes a valid chain of trust. Validation of the proof at least does not reveal data, deemed by the online service provider as being sensitive data, data associated with the chain of trust, and/or the signature on the attestation data.

At 608, a challenge is generated based on a first and second nonce. In some implementations, the first nonce is generated by the customer computing device and the second nonce is generated by the online service provider. The challenge may be compared against a different challenge to determine if the challenges match. Determining if the challenges match may be part of the proof validation process performed by the proof validator service 124. The different challenge may be generated by the online service provider.

Figure 7:
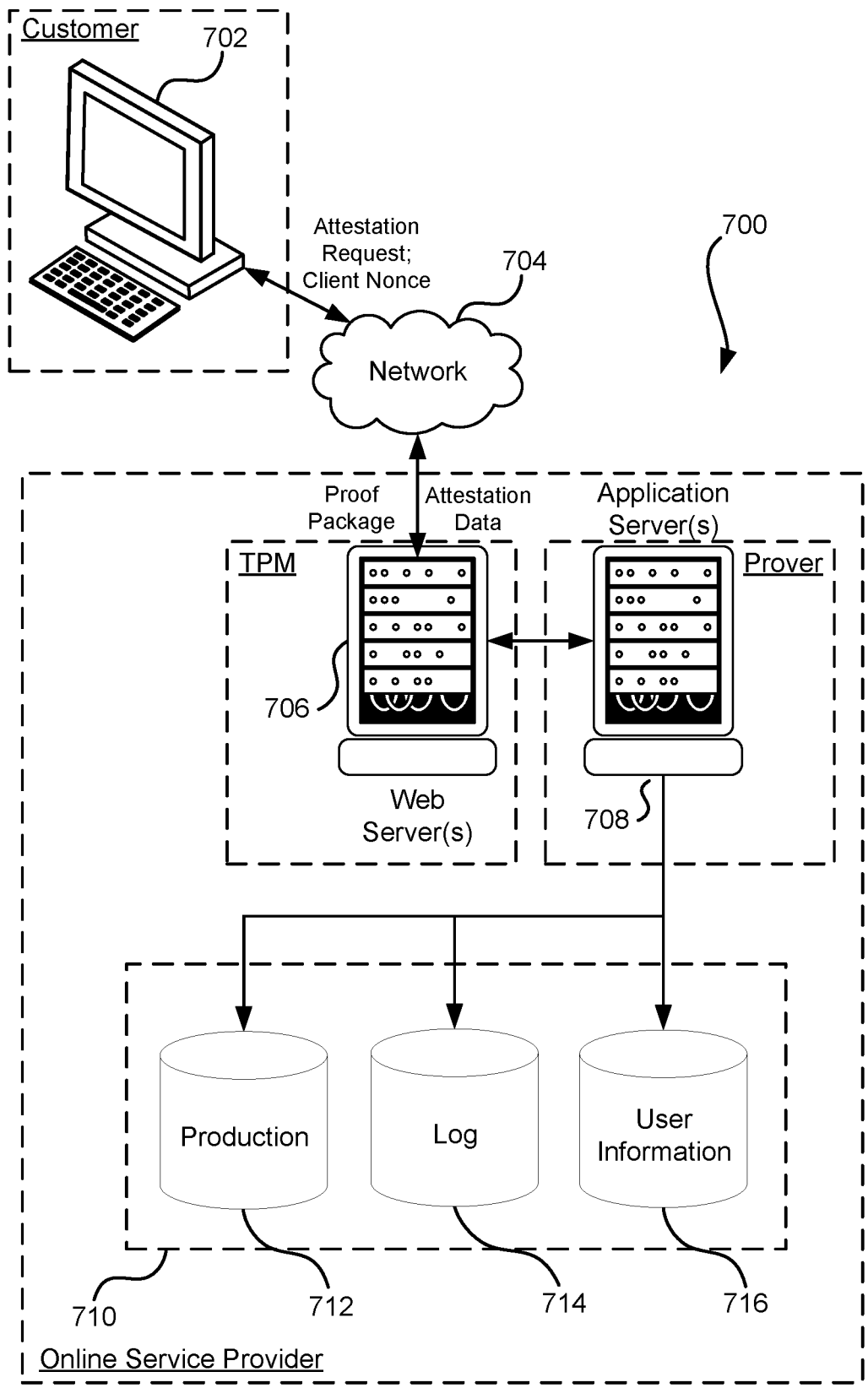
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media comprising executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory that stores computer-executable instructions that are executable by the one or more processors to cause the system to:
generate an attestation request; and
in response to the attestation request, obtain a proof to prove that signed attestation data was signed with a trusted private key of a host computing system and that the signed attestation data comprises valid configuration data of the host computing system, the proof devoid of at least data revealing a signature on the signed attestation data.

2. The system of claim 1, wherein the proof is a non-interactive zero-knowledge proof or an interactive zero-knowledge proof.

3. The system of claim 1, wherein the computer-executable instructions that are executable by the one or more processors further cause the system to generate a nonce and communicate the nonce and the attestation request to an attestation endpoint linked to the host computing system to generate the signed attestation data and the proof.

4. The system of claim 1, wherein the computer-executable instructions that are executable by the one or more processors further cause the system to obtain a circuit associated with a service that generated the proof, and use the circuit to process the proof to confirm that the signed attestation data was signed with the trusted private key and to further confirm that that the signed attestation data comprises the valid configuration data of the host computing system.

5. The system of claim 1, wherein the computer-executable instructions that are executable by the one or more processors further cause the system to obtain a challenge generated based on a nonce and another nonce obtained from a service that generated the proof.

6. The system of claim 5, wherein the computer-executable instructions that are executable by the one or more processors further cause the system to generate another challenge from the nonce and the other nonce, and verify the other challenge equals the challenge to confirm, at least in part, a validity of the proof.

7. The system of claim 1, wherein the computer-executable instructions that are executable by the one or more processors further cause the system to obtain the proof from a secure platform integrated with the host computing system verified by the attestation data, the secure platform storing the trusted private key and having access to a certificate comprising a public key associated with the trusted private key.

8. The system of claim 7, wherein the certificate comprises a valid chain of trust, the valid chain of trust generated by a certification authority that created the certificate, the proof further to prove that the certificate is a valid certificate created by the certification authority.

9. A computer-implemented method, comprising:
- obtaining a request to obtain attestation data associated with a host computing system of an online computer-implemented service provider;
- obtaining configuration data from the host computing system;
- in response to the request, generating the attestation data based on the configuration data, the attestation data including an attestation parameter including at least a portion of the configuration data;
- signing the attestation data using a private key of the host computing system to generate signed attestation data;
- forwarding the signed attestation data to a service that generates zero-knowledge proofs;
- obtaining, from the service that generates zero-knowledge proofs, a zero-knowledge proof to prove a validity of the attestation parameter including at least the portion of the configuration data, the zero-knowledge proof devoid of data identifying the host computing system; and
- in response to the request, communicating the zero-knowledge proof, the zero-knowledge proof verifiable to confirm the validity of the attestation parameter including at least the portion of the configuration data.

10. The computer-implemented method of claim 9, wherein the zero-knowledge proof is to further prove that the signed attestation data was signed with the private key of the host computing system.

11. The computer-implemented method of claim 9, wherein a trusted platform module (TPM) integrated with the host computing system signs the attestation data using the private key, the private key held by the TPM in a key storage integrated with the TPM.

12. The computer-implemented method of claim 9, further comprising forwarding a certificate comprising a public key corresponding to the private key to the service that generates the zero-knowledge proofs, and wherein the zero-knowledge proof is to further prove that the certificate comprising the public key includes a valid chain of trust.

13. A non-transitory computer-readable storage medium storing thereon executable instructions that, as a result of being executed by one or more processors of a computing system, cause the computing system to:
- generate an attestation request; and
- in response to the attestation request, obtain a proof to prove that signed attestation data was signed with a trusted private key of a host computing system and that the signed attestation data comprises valid configuration data of the host computing system, the proof devoid of at least data revealing a signature on the signed attestation data.

14. The non-transitory computer-readable storage medium of claim 13, wherein the proof is a non-interactive zero-knowledge proof or an interactive zero-knowledge proof.

15. The non-transitory computer-readable storage medium of claim 13, wherein the instructions further comprise instructions that, as a result of being executed by the one or more processors, cause the computing system to generate a nonce and communicate the nonce and the attestation request to an attestation endpoint linked to the host computing system to generate the signed attestation data and the proof.

16. The non-transitory computer-readable storage medium of claim 13, wherein the instructions further comprise instructions that, as a result of being executed by the one or more processors, cause the computing system to obtain a circuit associated with a service that generated the proof, and use the circuit to process the proof to confirm that the signed attestation data was signed with the trusted private key and to further confirm that that the signed attestation data comprises the valid configuration data of the host computing system.

17. The non-transitory computer-readable storage medium of claim 13, wherein the instructions further comprise instructions that, as a result of being executed by the one or more processors, cause the computing system to obtain a challenge generated based on a nonce and another nonce obtained from a service that generated the proof.

18. The non-transitory computer-readable storage medium of claim 17, wherein the instructions further comprise instructions that, as a result of being executed by the one or more processors, cause the computing system to generate another challenge from the nonce and the other nonce, and verify the other challenge equals the challenge to confirm, at least in part, a validity of the proof.

19. The non-transitory computer-readable storage medium of claim 13, wherein the instructions further comprise instructions that, as a result of being executed by the one or more processors, cause the computing system to obtain the proof from a secure platform integrated with the host computing system verified by the attestation data, the secure platform storing the trusted private key and having access to a certificate comprising a public key associated with the trusted private key.

20. The non-transitory computer-readable storage medium of claim 19, wherein the certificate comprises a valid chain of trust, the valid chain of trust generated by a certification authority that created the certificate, the proof further to prove that the certificate is a valid certificate created by the certification authority.

\* \* \* \* \*